United States Patent [19]
Pagano et al.

[11] Patent Number: 4,929,040
[45] Date of Patent: May 29, 1990

[54] FIVE MIRROR, TWO PERPENDICULAR PLANE IMAGE DEROTATOR

[75] Inventors: Thomas S. Pagano; Robert R. Turtle, both of Goleta, Calif.

[73] Assignee: Santa Barbara Research Center, Goleta, Calif.

[21] Appl. No.: 239,251

[22] Filed: Sep. 1, 1988

[51] Int. Cl.$^5$ .................. G02B 26/10; G02B 27/64
[52] U.S. Cl. ..................... 350/6.5; 350/500
[58] Field of Search ............... 350/6.5, 500, 370, 394, 350/407, 486, 618, 622, 623, 626, 631, 632, 539, 320

[56] References Cited

U.S. PATENT DOCUMENTS

| | | | |
|---|---|---|---|
| 4,103,991 | 8/1978 | Kramer | 350/622 |
| 4,160,956 | 9/1979 | Ivie | 250/216 |
| 4,202,597 | 5/1980 | Moore | 350/6.6 |
| 4,469,404 | 9/1984 | Taira | 350/539 |

OTHER PUBLICATIONS

"Pevhan Derotation Prism–Application & Alighment Notes", *Optical Engineering*, Nov./Dec. 1974, vol. 13, No. 6. pp. 6233–6234.

*Primary Examiner*—Bruce Y. Arnold
*Assistant Examiner*—Ronald M. Kachmarik
*Attorney, Agent, or Firm*—W. C. Schubert; W. K. Denson-Low

[57] ABSTRACT

An image derotator (10) uses five or a higher odd number of) mirrors mounted in two perpendicular planes. When used in scanning systems (14) that result in image rotation, the derotator (10) will derotate the image, thereby maintaining a constant image orientation. In addition, the derotator (10) permits a controlled amount of polarization sensitivity to be achieved, by adjusting the angles between the mirrors. Zero polarization sensitivity can also be achieved by proper adjustment of mirror angles.

15 Claims, 1 Drawing Sheet

FIVE MIRROR, TWO PERPENDICULAR PLANE IMAGE DEROTATOR

BACKGROUND OF THE INVENTION

1. Technical Field

This invention relates to optical scanning systems, and more particularly, to image derotators for use with optical scanners.

2. Discussion

Optical scanning systems have a wide variety of uses. These uses generally fall into two general categories: reading systems and reproducing systems. Reading systems interrogate an object scene and collect data. Reproducing systems reproduce information from processed data. Reading and reproducing systems utilize scanning mechanisms which direct either an outgoing light beam or an incoming light beam. Scanning mechanisms deflect light by means of reflective, refractive, or diffractive means. The path traced out by a scanning light beam is called a "scan trace" or "scan pattern". A scan trace may result from rotational, oscillatory or translational motion of optical components. Unfortunately, the motion of optical components used to create the scan trace can introduce undesirable alterations in the image produced. For example, rotational and oscillatory scanning can introduce undesirable image rotation. In addition, the optical components in a scanning system may also introduce polarization sensitivity. Polarization sensitivity results when the intensity of the light output from an optical component in the scanning system is dependent upon the polarization state of the incident light.

A number of systems have been developed to compensate for image rotation and polarization sensitivity in scanning systems. For example, image derotators are described in U.S. Pat. Nos. 4,166,959 and 4,202,597. However, in conventional image derotators the field of view is frequently very limited. In addition, image derotators commonly exhibit significant polarization sensitivity. One solution to the problem of polarization sensitivity in derotators, has been to employ scanning systems that do not introduce image rotation in the first place, thereby avoiding the necessity of an image derotator. Unfortunately, these scanning systems typically have more polarization sensitivity than image rotating scanners. In addition, the polarization sensitivity varies with scan angle.

One method of controlling the polarization sensitivity in a derotator is by increasing the number of mirrors, thereby reducing the angle of incidence of each mirror. This reduces the degree of polarization introduced by the reflection upon each mirror. However, transmission losses are increased with the increased number of reflections. Size and packaging constraints also limit the number of mirrors that may be employed. In addition, insofar as applicant is aware, zero polarization sensitivity has not been achieved in prior scanning system image derotators.

SUMMARY OF THE INVENTION

Pursuant to the present invention, an image derotator is provided that will provide any degree of image derotation while introducing a controlled amount of polarization sensitivity for all axial rotation angles of a scanning system. The image derotator uses five or a higher odd number of mirrors, mounted in two perpendicular planes. The image derotator can provide almost any fixed amount, or zero, polarization sensitivity for all axial rotation angles of the scanning device. The first mirror is mounted so that it will rotate about an axis that is coincident with the light beam incident upon the derotator. The light beam reflected by the first mirror and the light beam incident upon the first mirror are both contained in the first of the two perpendicular planes. The rest of the mirrors are rotatably mounted about the same axis of rotation as the first mirror, and all the mirrors are mounted in a fixed relationship with each other. The light that is reflected by the first mirror is incident upon the second and subsequent mirrors. As the light travels from the first mirror to the last mirror, it remains in a single plane that is perpendicular to the first plane. Upon reflection by the last mirror, the light beam will continue on a path that is colinear with its original path before it was reflected by the first mirror. As the derotator is rotated about the axis, the image is rotated. The amount and direction of this image rotation is equal and opposite to the rotation introduced by the scanner. The result is zero image rotation for the scanning system. Also, polarization sensitivity in this derotator does not vary with scan angle. Moreover, the angles between the mirrors can be selected to achieve zero polarization sensitivity. This results because there is cancellation of polarization as the light is reflected between the mirrors.

BRIEF DESCRIPTION OF THE DRAWING

The various advantages of the present invention will become apparent to one skilled in the art by reading the following specification and by reference to the drawings in which.

DESCRIPTION OF THE PREFERRED EMBODIMENTS

Figure 1:
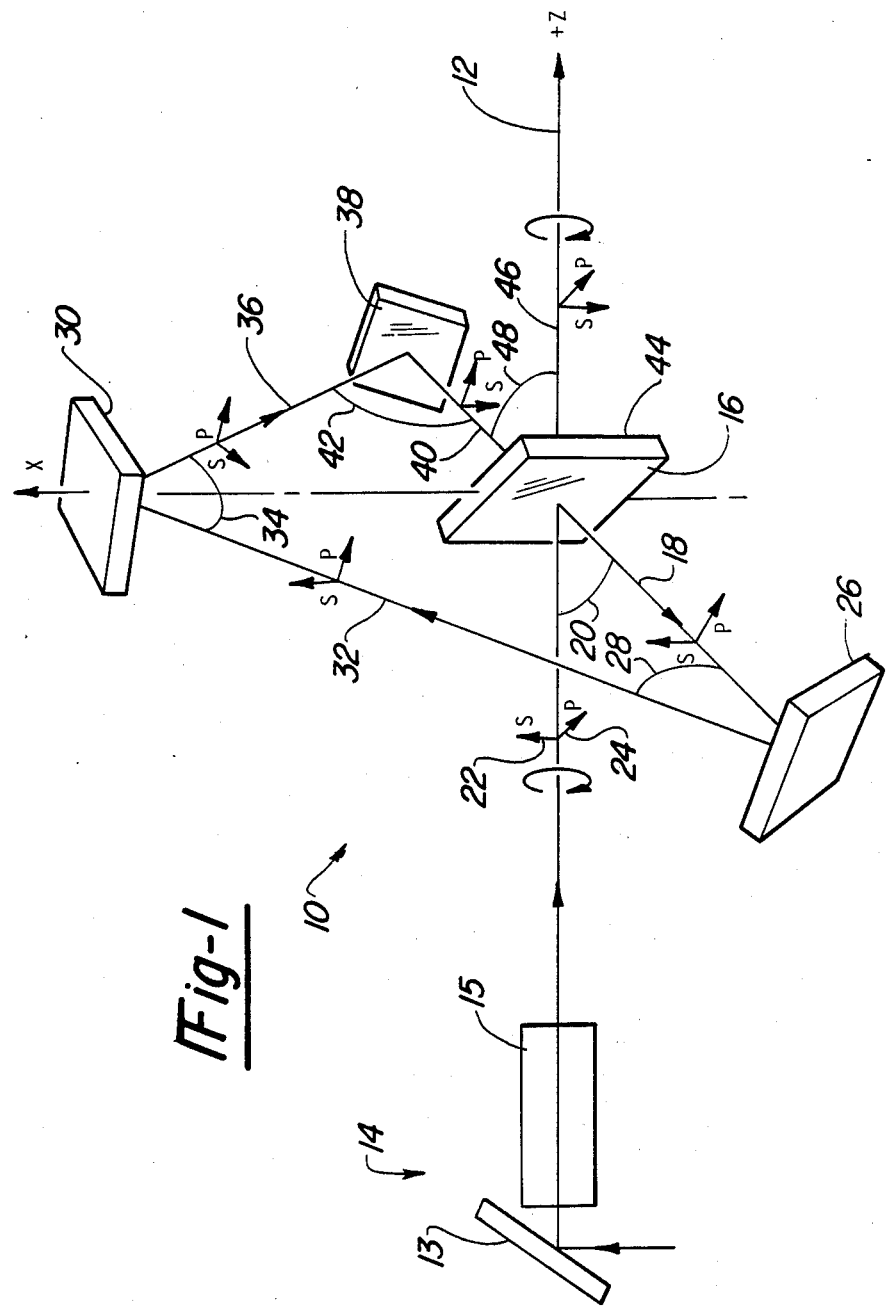
FIG. 1 is a perspective view of the mirrors and ray traces for an image derotator in accordance with the teachings of the present invention.

Turning now to FIG. 1, an image derotator 10 is provided for eliminating the rotation introduced into an image by an optical scanning system. A rotatable support means (not shown) rotates the derotator 10 about an axis 12. Light output from an optical scanner 14 is directed along the axis 12 from the left side of the drawing toward the right side. The image contained in this incident light from the scanner 14 will rotate because of the scanning motion of the optical scanner 14. In particular, light containing an image enters a scanning mirror 13 and then passes through a telescope 15 before entering the derotator 10. The rotation of the scanning mirror 13 will occur in a fixed relation with that of the derotator 10. At the input of the derotator 10 the image is rotating because of the motion of the scanning mirror 13. At the focal plane at the output of the derotator 10 the image no longer rotates.

A first mirror 16 is positioned in the path of the incident light from 14. The mirror 16 is attached to the rotatable support means in such a way as to permit rotation of the first mirror 16 about the axis 12. Preferably, axis 12 passes through the center of the first mirror 16. The incident light 14 strikes the first mirror 16 at an angle such that the angle between the incident light 14 and a reflected beam 18 equals a first angle 20. It should be noted that the incident light 14 has a polarization which is represented by an S vector 22 and a P vector 24. The P vector 24 represents the magnitude of the polarization of beam 14 in the P plane. The P plane, also known as the parallel plane, is defined as the plane which includes the optic axis of the beam and a line normal to the surface of a plane which is at an angle incident to the optical axis of the beam. In this case, the plane which is at an angle incident to the optical axis of the beam is coplanar with the surface of the first mirror 16. The S vector 22, likewise, represents the magnitude of the polarization of the light beam 14 in the S plane. The S plane is defined as the plane that is orthogonal to the P plane. When the incident light beam from the scanner 14 strikes the surface of the first mirror 16, the reflected beam 18 will have S and P vectors 22, 24 with different magnitudes than before reflection because of polarization by reflection. In particular, a greater proportion of the light polarized in the S plane will be reflected than will light polarized in the P plane. The degree of polarization by reflection is dependent upon the magnitude of the first angle 20 and the particular material or coating of the mirror 16. The method of calculating the first angle 20 to achieve a particular output polarization sensitivity will be described below.

A second mirror 26 is mounted to the rotatable support means in a fixed relationship to first mirror 16. The second mirror 26 is positioned so that the light beam 18 is incident upon the second mirror at an angle such that the angle between the incident and reflected beams equals a second angle 28. Further, the second mirror 26 is positioned so that the second angle 28 lies in a plane that is perpendicular to the plane containing the first angle 20. Because the second angle 28 is in a perpendicular plane, the S polarization vector 22 now lies in the plane containing the second angle 28. In contrast, when the incident beam from the scanner 14 was reflected from the first mirror 16, the S vector was in a plane perpendicular to the first angle 20. Consequently, the polarization effect introduced by the second mirror 26 will be opposite to that of the first mirror 16. In particular, a greater proportion of the P vector will be reflected and a lesser amount of the S vector 22 will be reflected. The result will be a partial cancellation of the polarization effect due to by reflection off the first mirror 16.

A third mirror 30 is mounted to the rotatable support means in a fixed relationship to the first mirror 16 and the second mirror 26. The third mirror 30 is positioned such that the light beam 32 that is reflected from the second mirror 26 is incident upon the third mirror 30 and forms a third angle 34 with a beam 36 that is reflected from the third mirror 30. Further, the third angle 34 lies in the same plane as the second angle 28. Because the third angle 34 is in the same plane as the second angle 28, the polarization by reflection off the third mirror 30 will be similar to that of the second mirror 26. That is, it will further cancel the polarization caused by the first mirror 16.

A fourth mirror 38 is mounted to the rotatable support means in a fixed relationship to the first mirror 16, the second mirror 26 and the third mirror 30. The fourth mirror 38 is mounted so that the incident light 36 is reflected off the fourth mirror 38 such that the angle between the incident light 36 and a reflected beam 40 is a fourth angle 42. Also, the fourth mirror 38 is positioned such that the fourth angle 42 lies in the same plane as the angle 34 and the second angle 28. Because of this, the polarization caused by the fourth mirror 38 will further cancel the polarization caused by the first mirror 16.

A fifth mirror 44 is mounted to the rotatable support means in a fixed relationship to the first mirror 16, the second mirror 26, the third mirror 30, and the fourth mirror 38. The fifth mirror 44 is positioned so that the angle between the incident light 40 and a reflected beam 46 is a fifth angle 48. In addition, the fifth mirror 44 is positioned so that the fifth angle 48 lies in the same plane as the first angle 20. It can be seen that the P vector 24 is also in the same plane as the fifth angle 48, as it was during reflection off the first mirror 16. As a result, the polarization caused by the fifth mirror will be similar to that of the first mirror, in that a lesser proportion of the light polarized in the P direction will be reflected as will light polarized in the S direction. As shown in FIG. 1, the fifth mirror 44 may be mounted to the back of the plate on which the first mirror 16 is formed. Further, the mirrors may be arranged so that the final reflected beam 46 is colinear with the incident beam from the scanner 14.

In summary, the polarization caused by the first mirror 16 and the fifth mirror 44 is opposite to that of the second mirror 26, the third mirror 30 and the fourth mirror 38. This is because the first angle 20 and the fifth angle 48 lie in a first plane and the second angle 28, the third angle 34 and the fourth angle 42 all lie in a perpendicular plane. Consequently, these angles can be predetermined in a way to control the polarization sensitivity of the derotator 10. Specifically, to calculate the polarization sensitivity of the derotator 10, the polarization sensitivity is first defined as the ratio of the difference over the sum of the S and P polarization reflection components, $R_s$ and $R_p$.

$$P = \frac{R_s - R_p}{R_s + R_p}$$

For a system of polarization sensitive elements such as the five mirror derotator 10, the polarization sensitivity is defined as the ratio of the difference over the sum of the overall system polarization reflection components, $R_s'$ and $R_p'$. In the five mirror derotator 10, assuming all mirrors have identical coatings, the overall system polarization system is the product of individual polarization reflection of the individual elements:

$$R_s' = R_s(M1)\, R_p(M2)\, R_p(M3)\, R_p(M4)\, R_s(M5)$$

$$R_p' = R_p(M1)\, R_s(M2)\, R_s(M3)\, R_s(M4)\, R_p(M5);$$

where $R_{s,p}(MX) = $ S,P polarization reflection component after reflection off mirror X at an angle of $T^X$ relative to the mirror normal, where TX = the angle between the incident and reflected beams off mirror X. The polarization transmission components for mirrors M2, M3 and M4 are reversed since the reflections occur in planes perpendicular to the reflections of M1 and M5 as explained above.

Since T1 equals T5 and both reflections occur in the same plane, $R_p(M1) = R_p(M5)$ and $R_s(M1) = R_s(M5)$. The polarization sensitivity now becomes $$P = \frac{R_s^2(M1)\,R_p(M2)\,R_p(M3)\,R_p(M4) - R_p^2(M1)\,R_s(M2)\,R_s(M3)\,R_s(M4)}{R_s^2(M1)\,R_p(M2)\,R_p(M3)\,R_p(M4) + R_p^2(M1)\,R_s(M2)\,R_s(M3)\,R_s(M4)}$$

By adjusting the five angles of the five mirrors, almost any degree of polarization sensitivity can be achieved. For zero polarization sensitivity, the constraint is simply $$R_s^2(M1)\,R_p(M2)\,R_p(M3)\,R_p(M4) = R_p^2(M1)\,R_s(M2)\,R_s(M3)\,R_s(M4).$$

One example of a zero polarization sensitivity case of the five-mirror derotator 10 will be described. Allow the angles of mirrors M2, M3, and M4 to be equal, i.e.

$$T2 = T3 = T4 = 60°$$

Then $R_s(M2) = R_s(M3) = R_s(M4)$ and $R_p(M2) = R(M3) = R_p(M4)$, so we get $$R_s^2(M1)\,R_p^3(M2) = R_p^2(M1)\,R_s^3(M2)$$

which reduces to $$\frac{R_s(M1)}{R_p(M1)} = \left[\frac{R_s(M2)}{R_p(M2)}\right]^{3/2}$$

Substituting in typical values for coated silver at 0.4 μm at mirror incidence angles of $30° = T2/2$ $$R_s(M2) = 0.948 \text{ and } R_p(M2) = 0.929$$

we get $$\frac{R_s(M1)}{R_p(M1)} = 1.031$$

This relationship occurs at a mirror incidence angle of approximately $$\frac{(\tfrac{1}{2})T1}{\text{or}} = 39° \text{ which gives } T1 = 78°.$$
$$\frac{T1}{2}$$

Therefore, one possible zero polarization sensitivity derotator has angles $T1 = T5 = 78°$, and $T2 = T3 = T4 = 60°$.

From the foregoing description, it can be appreciated that the image derotator 10 will derotate an image and permit a relatively wide field of view, such as 45° or larger. Also, the derotator 10 will have a relatively high signal-to-noise ratio while maintaining a low or zero polarization sensitivity. Further, the present invention permits the use of scan techniques that result in image rotation because of its ability to derotate an image. Those skilled in the art can appreciate that other advantages can be obtained from the use of this invention and that modifications such as the use of more than 5 mirrors can be made without departing from the true spirit of the invention after studying the specification, drawings and the following claims.

What is claimed is:

1. An optical apparatus comprising:
   a support means rotatable about an axis;
   a first mirror fixedly attached to said support means, wherein said axis is incident upon said first mirror and said first mirror is disposed to receive and reflect an incident beam of light at a first angle;
   a second mirror fixedly attached to said support means, said second mirror disposed to receive and reflect, at a second angle, the light that is reflected by the first mirror at a first angle;
   a third mirror fixedly attached to said support means, said third mirror disposed to receive and reflect at a third angle, said light that is reflected by the second mirror at a second angle;
   a fourth mirror fixedly attached to said support means, said fourth mirror disposed to receive and reflect at a fourth angle, said light that is reflected by the third mirror at a third angle; and
   a fifth mirror fixedly attached to said support means, said fifth mirror disposed to receive and reflect at a fifth angle, said light that is reflected by the fourth mirror at a fourth angle, wherein said fifth mirror is also disposed so that said light that is received at a fifth angle is reflected colinear to the incident beam of light and wherein said mirrors are disposed so that the optical axis of the incident beam and the optical axis of said light that is reflected by said first mirror at a first angle lie in a first plane, and the light that is reflected by the second mirror, the third mirror and the fourth mirror lies in a second plane, and the light that is reflected by said fifth mirror lies in the first plane.

2. The apparatus of claim 1 where in the fifth mirror is formed on the back of the first mirror.

3. The apparatus of claim 1 which the incident beam of light is colinear to said axis.

4. The apparatus of claim 1 wherein the first, second, third, fourth and fifth angles are chosen so that the overall polarization sensitivity of the apparatus is approximately zero.

5. The apparatus of claim 1 wherein the second, third and fourth angles total approximately 180 degrees.

6. An optical scanning system comprising:
   an optical scanner for producing an image, said scanner employing a scanning technique that introduces rotation into the image;
   support means rotatable about an axis;
   a first mirror fixedly attached to said support means wherein said axis is incident upon said first mirror and said first mirror is disposed to receive and reflect an incident beam of light from the scanner at a first angle;
   a second mirror fixedly attached to said support means, said second mirror disposed to receive and reflect at a second angle said light from the scanner that is reflected by the first mirror at a first angle;
   a third mirror fixedly attached to said support means, said third mirror disposed to receive and reflect at a third angle said light that is reflected by the second mirror at a second angle;
   a fourth mirror fixedly attached to said support means, said fourth mirror disposed to receive and reflect at a fourth angle said light that is reflected by the third mirror at a third angle; and
   a fifth mirror fixedly attached to said support means, said fifth mirror disposed to receive and reflect at a fifth angle said light that is reflected by the fourth mirror at a fourth angle, wherein said fifth mirror is also disposed so that said light that is reflected at a fifth angle is reflected colinear to said incident beam of light, wherein said mirrors are disposed so that the optical axis of said light that is incident and reflected by said first mirror at a first angle, lies in a first plane, and light that is reflected by the second mirror, the third mirror and the fourth mirror lies in a second plane, said second plane being perpendicular to said first plane, and wherein the light that is reflected by the fifth mirror lies in said first plane, whereby said mirrors produce rotation in said image which is substantially equal and opposite to the image rotation due to the scanner.

7. The optical scanning system of claim 6 wherein the fifth mirror is formed on the back of the first mirror.

8. The optical scanning system of claim 6 wherein the incident beam of light is colinear to said axis.

9. The optical scanning system of claim 6 wherein the first, second, third, fourth and fifth angles are chosen so that the overall polarization sensitivity of the apparatus is approximately zero.

10. The optical scanning system of claim 6 wherein the second, third and fourth angles total approximately 180 degrees.

11. The methods of derotating an optical image, said method comprising:
supporting a set of mirrors in a fixed spatial relation with respect to each other;
directing an incident beam of light containing a rotating image at the first mirror so that the light is reflected at a first angle;
directing said light that is reflected by the first mirror at a second mirror so that the light is reflected by the second mirror at a second angle;
directing the light that is reflected by the second mirror at a third mirror so that the light is reflected by the third mirror at a third angle;
directing the light that is reflected by the third mirror at a fourth mirror so that the light is reflected by the fourth mirror at a fourth angle; and
directing the light that is reflected by the fourth mirror at a fifth mirror so that the light is reflected by the fifth mirror at a fifth angle;
positioning the mirrors so that the optical axis of the incident beam and the optical axis of said light that is reflected by the first mirror at a first angle lie in a first plane, and the light that is reflected by the second mirror, the third mirror and the fourth mirror lies in a second plane, said second plane being perpendicular to the first plane, and the light that is reflected by said fifth mirror lies in said first plane, and
rotating said mirrors about said axis whereby said image is rotated while the mirrors rotate.

12. The method of claim 11 further comprising positioning the mirrors so that the second, third and fourth angles total approximately 180°.

13. The method of claim 11 further comprising mounting the fifth mirror to the back of the first mirror.

14. The method of claim 11 further comprising the step of positioning the first mirror so that the incident beam of light is colinear to said axis.

15. The method of claim 11 further comprising the steps of positioning the mirror so that the first, second, third, fourth and fifth angles result in a overall polarization sensitivity of approximately zero.

* * * * *